Nov. 29, 1927. 1,650,796
C. KELLOGG
FRUIT AND NUT PICKER
Filed March 17, 1924 2 Sheets-Sheet 2

INVENTOR
CHARLES KELLOGG.
BY
Graham + Davis
ATTORNEYS.

Patented Nov. 29, 1927.

1,650,796

UNITED STATES PATENT OFFICE.

CHARLES KELLOGG, OF MORGAN HILL, CALIFORNIA.

FRUIT AND NUT PICKER.

Application filed March 17, 1924. Serial No. 699,758.

The invention relates to devices for gathering nuts, fruit, or other objects from the ground or from other surfaces upon which such objects may rest. For example, in harvesting prunes, it is now necessary to pick up the fruit by hand from the ground and my invention is especially adapted to gather this fruit. It is also adapted to the gathering of nuts from the ground or can be used to pick up and segregate any class of objects which do not vary too widely in size or shape.

As any device for this purpose must often be used on ground or irregular contour, it is an object of my invention to provide a device so constructed that it will pick up the desired objects even when they lie in considerable depressions.

While my invention can be adapted to the gathering of a wide variety of objects, it has a special utility in the gathering of prunes, and it is an object of my invention to provide a harvesting device which is especially adapted to this purpose. With this, and other objects, in view, I provide a drum which may be rolled over the surface of the ground but which is sufficiently flexible to follow the general contour of the ground. Upon the surface of this drum I affix pins or prongs which may directly impale the fruit or other objects to be gathered or which are so spaced that the object lodges between these prongs and is retained thereby. The latter condition occurs where the device is used to gather walnuts or other objects which, on account of their nature, cannot be successfully impaled.

In the gathering of fruit or nuts, it is quite necessary that the average pressure of the drum on the ground be kept low enough to prevent the objects to be gathered from being crushed and it is also necessary that the pressure be kept high enough to either impale or engage such objects. It is a further object of my invention to provide gravity responsive means for producing the desired pressure, the amount of such pressure being readily increased or diminished as may be found necessary.

It is an important object of this invention to provide a device which may be arranged to be installed on a tractor in such manner that the tractor may serve both to move the device over the ground and also to drive the various mechanisms included in the device.

Further objects of the invention and the advantages thereof will be made evident hereinafter.

In the following specification I will describe one useful embodiment of my invention without, of course, intending to limit myself to any particular application thereof.

Referring to the drawings which are for illustrative purposes only,

Fig. 5 is a view showing the method of picking up an English walnut or the like.

Figure 1:
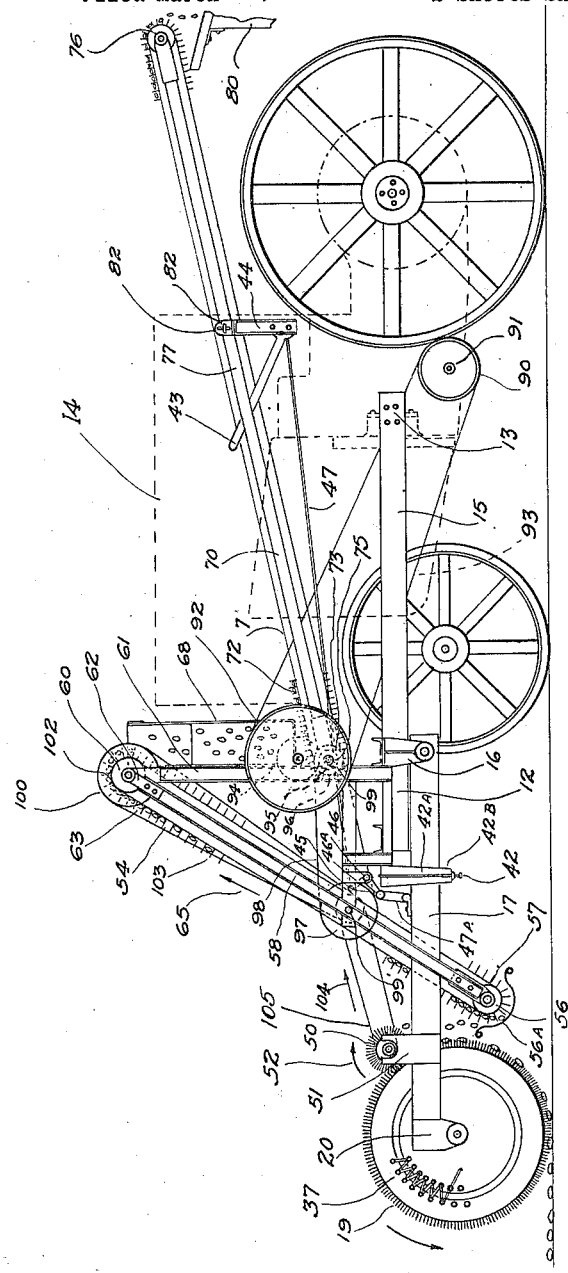
Fig. 1 is a diagrammatic side elevation of a prune gatherer which embodies the features of my invention and which is shown as adapted for use on a tractor.

As shown in Fig. 1, my fruit gatherer may comprise a primary frame structure 12, which may be rigidly secured as at 13 to a propelling vehicle such as a tractor 14. Pivoted to the side bars 15 of the frame 12, as by the bracket members 16, are shown adjustable arms 17 of a secondary or picker frame carrying a gathering drum 19, shown as rotatably secured by the brackets 20 at the forward ends of these arms 17.

Figure 2:
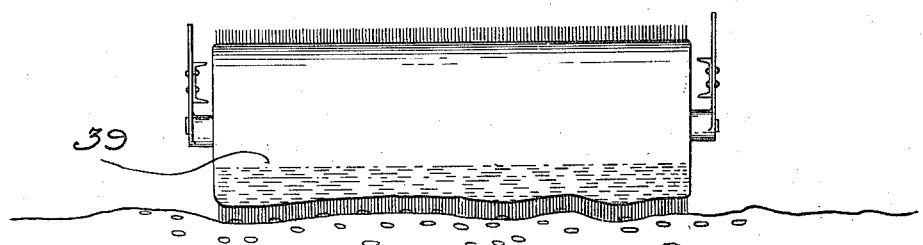
Fig. 2 is a fragmentary view showing a gathering drum which includes important features of my invention.
Figure 3:
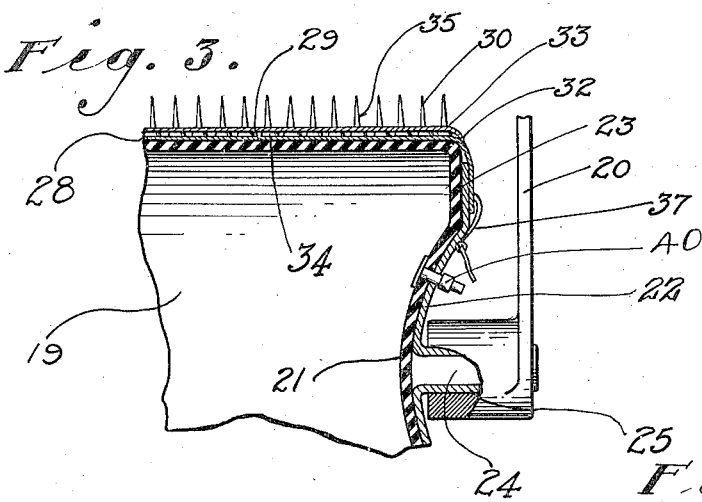
Fig. 3 is a fragmentary section of one end of the gathering drum, illustrating a manner in which the gathering prongs may be retained on the face of the drum.
Figure 4:
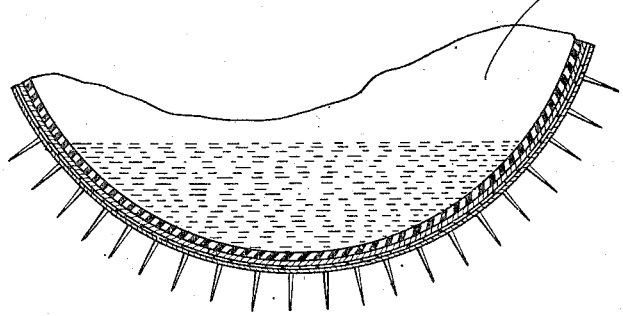
Fig. 4 is a fragmentary cross section of the drum, showing a manner in which the gathering prongs may be caused to engage the ground.

As above mentioned, the drum 19 may embody important features of my invention; and a preferred type of drum is shown in detail in Figs. 2, 3 and 4, in which the drum 19 may be comprised of a flexible or elastic cylindrical body or shell 21, which may be made from a material such as rubber. A plurality of drums may, of course, be used if desired. The elastic body or shell 21 may extend between and be retained by metallic end members 22 secured to the respective ends by means comprising flanges 23, which may be secured to the drum by cementing and may be integral with stub shafts 24, shown as rotatable in bearing boxes 25 of the brackets 20 on arms 17.

To limit the expansion of the body 21, and to provide resistance to the movement and the wear of impaling pins, I may employ a composite retaining member 28 on the peripheral face 29 of the shell 21. This retaining member may consist of an inner fabric member 32 and an outer fabric member 33. The heads 34 of the pins or prongs 30 are shown as held between the members 32 and 33, the prong portions 35 projecting through holes in the outer member 33. This arrangement provides a simple, strong and effective way of securing the prongs on the shell and the inner member 32 protects the shell from being ruptured by the heads 34 of the prongs 30.

One of the mentioned fabric members, preferably the inner member 32 may extend radially along the ends of the shell 21 and be laced thereto somewhat as indicated at 37, to hold the retaining member 28 in place on said shell.

An interesting and advantageous feature of my novel gatherer is the optional placing of water or other liquid at 39, inside the shell 21, as shown in Figs. 2 and 3, the shell 21 being so inflated as by the valve 40, that it will normally remain substantially cylindrical, although yielding inwardly against the weight and pressure of the enclosed fluids. This construction of the drum provides gravity responsive means for forcing the drum to conform to the contour of the ground. When there are inequalities in the surface over which the drum is passing, as in Fig. 2, the shell 21 may readily assume a contour in accordance with the surface, because this shell is of a flexible nature, and elastically supported. Because of this construction, the fruit will not be excessively bruised, as it would be by a concentration of all the weight of the drum at one place when the inequalities occur, nor is the drum likely to fail to pick up any fruit because of failure to make contact therewith. The engagement between the drum and the ground may be reguluated by means such as the manipulation of an adjustment screw 42 on a bracket 42ᵃ secured to side bars 15, thereby determining the lowest position of the arm 17. The interposition of a spring 42ᵇ is optional. The drum may be lifted from engagement with the ground by pulling rearwardly upon a lever 43, shown as pivoted to the lower portion of the bracket 44. This may swing the bell crank lever 45, shown as pivoted at 46 to the fixed brackets 46ᵃ, through the rod 47, in such a manner as to lift the forward ends of the arms 17 upwardly through the links 47ᵃ as shown in Fig. 1.

As the tractor moves forward, the gathering drum 19 may be rotated by its engagement with the ground and in such manner that the prongs 30 are forced into any fruit lying on the ground. As the drum rotates, the prunes or other fruits are carried on or between the prongs until they reach removing means such as the brush 50, which may be rotatably disposed in the brackets 51 secured to the adjustable arms 17. The brush 50 may be rotated in the direction indicated by the arrow 52, thereby removing the fruit from the prongs 30. This fruit may fall or be impelled by the brush onto the lower end of a primary conveyor belt 54, which may be disposed below the brush, as shown in Fig. 1, and may extend over a lower wheel 56, shown as surrounded by a guard or guide plate 56ᵃ and as rotatably mounted in brackets 57, shown as secured to the lower ends of the channel bars 58. The mentioned conveyor belt, instead of running directly to a receiving receptacle, may extend upwardly and rearwardly over the wheel 60, which may be rotatably secured, as by brackets 62, to supporting frame elements such as the channel bars 58 and 61.

Fruit carried upwardly by means such as the belt 54, shown as provided with drag plates 63, to retain the fruit thereon, may be dropped from the upper end of said conveyor onto a chute 68, which may have the form of a sheet metal trough secured to the upright frame element 61, as shown.

The chute 68 may be arranged to deliver the fruit received from the upper end of the primary conveyor 54, which is presumably positioned centrally in front of the tractor 13, to the forward and lower end of a secondary conveyor 70. The conveyor 70 is shown as comprising a belt 71, carrying drag plates 72; this belt may pass over a wheel 73, which may be pivotally secured, as by the brackets 75, to the upright 61 and it may also pass over a wheel 76, rotatably secured at or near the rearward ends of the spacing or supporting elements such as the channel bars 77. The fruit, passing from the chute 68 onto the lower end of the conveyor belt 71, will obviously be carried rearwardly thereby and may be finally delivered to a receptacle such as is indicated at 80, this receptacle being optionally in the form of a trailer attached to the rear of the tractor 14.

The rearward end of the conveyor 70 may be elevated or lowered as desired, by swinging the bars 77, pivoted as described, the bolt 82 at the upper part of the bracket 44 being shown as adjustable in slots 82'. The primary conveyor 54, the secondary conveyor 70 and the fruit removing brush 50, or their equivalents, may all be driven from the tractor. For this purpose, a pulley 90 may be secured on the shaft 91, shown as extending from the transmission of the tractor 14. As shown, the pulley 90 drives a wheel 92 through a belt 93, and the wheel 92 rotates a gear 94, which engages a gear 95, turning the conveyor wheel 73. A wheel 96 turned by the gear 95, through the shaft 99 of the wheel 96, drives the wheel 97 by a belt 98, the mentioned wheel 97 being mounted on a shaft 99', rotatably mounted between the channel bars 58; and the shaft 99, through the belt 103, rotates a pulley 100, which drives the wheel 102, driving the conveyor 54; and it also drives, through the belt 105, the revolving brush 50 in the direction of the arrow 104. The shaft 99 may extend through brackets 75 and thereby serve to pivotally support the channel bars 77.

The above described fruit gatherer may be readily installed on any one of the various common tractors, or on other propelling means, without necessitating expensive alterations. It is easily arranged to be mechanically operated from a tractor and the described drum construction insures the gathering of practically all the usable fruit with a minimum of injury thereto.

My gathering drum and primary conveyor may normally occupy a central position relatively to any advancing means such as a tractor, the described chute and secondary conveyor thus constituting means whereby the gathered fruit may be shifted and delivered rearwardly along a lateral path, clearing the body of the tractor; and it is of course important that when a prune picker of my novel design is to be advanced by a tractor, the inflatable gathering drum, preferably provided with my described means for applying more internal pressure to the bottom than to the top thereof, shall be so mounted as to permit of its elevation from the ground during turning movements or otherwise as desired. My picker may be made of any width suitable to the nature of the ground and consistent with other conditions to be met.

It will be understood that, although I have above described one complete organization in which various features of my invention cooperate in an advantageous manner, many of said features may be capable of independent use; and extensive modifications in organization and design might be made by those skilled in the art, without the slightest departure from the spirit and scope of my invention, as the same is indicated above and in the following claims.

Figure 5:
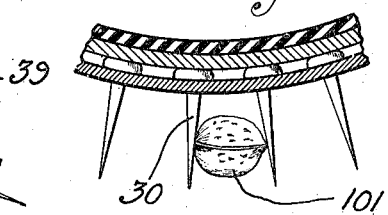

While, for example, I have described my invention as used in the harvesting of prunes, it is directly applicable to the harvesting of other fruits or nuts. It is not always necessary that the object to be gathered be impaled upon the pins 30. In gathering walnuts, for example, the walnut 101 may be forced between the pins 30, being held therebetween by reason of the elasticity of the pins 30 and the mounting means thereof. Such a walnut 101, so supported, is shown in Fig. 5.

I claim as my invention:

1. A device for gathering objects comprising: a drum having a flexible outer wall adapted to conform to the contour of the surface over which the drum is rolled; and means carried by said drum adapted to engage and retain said objects.

2. A device for gathering objects comprising: a drum having a flexible outer wall adapted to conform to the contour of the surface over which the drum is rolled; means carried by said drum adapted to engage and retain said objects; and gravity responsive means assisting said drum to follow the contour of said surface.

3. A device for gathering objects comprising: a resilient drum adapted to yieldably contact a surface upon which said objects lie; members carried by said drum and projecting therefrom, said members being adapted to pick up said objects; and means for causing said members to closely follow the contour of said surface.

4. A device for gathering objects comprising: a drum comprising a wall of rubber and fabric; and pins carried by said drum and projecting outwardly for engaging and retaining said objects.

5. A device for gathering objects comprising: a drum comprising a wall of rubber and fabric; pins carried by said drum and projecting outwardly for engaging and retaining said objects; and means assisting the wall of said drum to follow the contour of a surface over which said drum may be rolled.

6. A device for gathering objects comprising: a drum comprising a wall of rubber and fabric; pins carried by said drum and projecting outwardly for engaging and retaining said objects; and a body of liquid inside said drum assisting the wall of said drum to follow the contour of a surface over which said drum may be rolled.

7. In a device for gathering objects, a resilient drum comprising: a cylindrical body of resilient material; two layers of fabric encircling the periphery of said drum; and pins extending radially from said drum, said pins having heads held between said layers of fabric.

8. In a device for gathering objects, the combination of: a resilient drum adapted to have rolling contact with a surface; means carried by said drum adapted to engage objects; means for disengaging the objects from said engaging means; a first conveyor for transporting the objects when disengaged; a second conveyor for transporting the objects delivered from said first conveyor; a bracket for supporting said second conveyor; and means for adjusting said second conveyor upon said bracket at different angles.

9. A device for gathering objects from an irregular surface and which comprises: a drum, the outer peripheral wall of which is yieldable inwardly; and object picking-up means provided upon the external surface of said peripheral wall, said means conforming to said surface when said drum is rolled over said surface, due to the yieldable character of said peripheral wall.

10. A device for gathering objects from an irregular surface and which comprises: a drum, the outer peripheral wall of which is yieldable inwardly; objects picking-up means provided upon the external surface of said peripheral wall, said means conforming to said surface when said drum is rolled over said surface, due to the yieldable character of said peripheral wall; and pressure means including a body of fluid through which pressure is applied to said peripheral wall to cause said picking-up means to pressurally conform to said surface.

11. A device for gathering objects from an irregular surface and which comprises: a drum, the outer peripheral wall of which is yieldable inwardly; object picking-up means provided upon the external surface of said peripheral wall, said means conforming to said surface when said drum is rolled over said surface, due to the yieldable character of said peripheral wall; and a body of liquid disposed in said drum and exerting a pressure against said peripheral wall to cause said picking-up means to pressurally conform to said surface.

12. A device for gathering objects from an irregular surface and which comprises: a drum, a peripheral wall of which is yieldable inwardly; object picking-up means provided upon the external surface of said peripheral wall, said means conforming to said surface when said drum is rolled over said surface, due to the yieldable character of said peripheral wall; and pressure means including a body of fluid through which pressure is applied to said peripheral wall to cause said picking-up means to pressurally conform to said surface.

13. A device for gathering objects from an irregular surface and which comprises: a drum, a peripheral wall of which is yieldable inwardly; object picking-up means provided upon the external surface of said peripheral wall, said means conforming to said surface when said drum is rolled over said surface, due to the yieldable character of said peripheral wall; and a body of liquid disposed in said drum and exerting a pressure against said peripheral wall to cause said picking-up means to pressurally conform to said surface.

In testimony whereof, I have hereunto set my hand at San Jose, California, this 5 day of March, 1924.

CHARLES KELLOGG.